United States Patent
Masuta et al.

(10) Patent No.: US 10,093,383 B1
(45) Date of Patent: Oct. 9, 2018

(54) BICYCLE OPERATING DEVICE

(71) Applicant: SHIMANO INC., Sakai (JP)

(72) Inventors: Noriko Masuta, Sakai (JP); Tsutomu Nanase, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/468,048

(22) Filed: Mar. 23, 2017

(51) Int. Cl.
| | |
|---|---|
| *F16H 59/08* | (2006.01) |
| *B62K 23/02* | (2006.01) |
| *B60R 16/00* | (2006.01) |
| *G08C 17/02* | (2006.01) |
| *H01H 13/14* | (2006.01) |

(52) U.S. Cl.
CPC ............ *B62K 23/02* (2013.01); *B60R 16/005* (2013.01); *G08C 17/02* (2013.01); *H01H 13/14* (2013.01)

(58) Field of Classification Search
None
See application file for complete search history.

(56) References Cited

U.S. PATENT DOCUMENTS

| | | | |
|---|---|---|---|
| 7,565,848 B2 | 7/2009 | Fujii | |
| 7,908,940 B2 | 3/2011 | Naka et al. | |
| 8,297,143 B2 | 10/2012 | Fujii et al. | |
| 8,886,417 B2 * | 11/2014 | Jordan | B62M 25/08 200/61.88 |
| 9,399,500 B1 * | 7/2016 | Hashimoto | B62M 9/122 |
| 9,517,702 B2 * | 12/2016 | Gao | B60L 11/1861 |
| 9,616,964 B2 * | 4/2017 | Kasai | B62M 25/08 |
| 2015/0284049 A1 * | 10/2015 | Shipman | B62K 23/06 74/473.12 |
| 2016/0347415 A1 | 12/2016 | Katsura et al. | |

* cited by examiner

*Primary Examiner* — K. Wong
(74) *Attorney, Agent, or Firm* — Mori & Ward, LLP (57) ABSTRACT

A bicycle operating device comprises a base member, a user interface member, an electrical switch, and a transmitting structure. The user interface member is movably mounted to the base member to move relative to the base member in a first direction. The electrical switch is mounted to the base member. The transmitting structure is provided between the user interface member and the electrical switch to transmit a first movement of the user interface member in the first direction to the electrical switch in a second direction different from the first direction.

26 Claims, 8 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an operating device.

SUMMARY OF THE INVENTION

In accordance with a first aspect of the present invention, a bicycle operating device comprises a base member, a user interface member, an electrical switch, and a transmitting structure. The user interface member is movably mounted to the base member to move relative to the base member in a first direction. The electrical switch is mounted to the base member. The transmitting structure is provided between the user interface member and the electrical switch to transmit a first movement of the user interface member in the first direction to the electrical switch in a second direction different from the first direction.

With the bicycle operating device according to the first aspect, the transmitting structure improves freedom of the arrangement of the electrical switch.

In accordance with a second aspect of the present invention, the bicycle operating device according to the first aspect is configured so that the transmitting structure includes an input member movable relative to the base member in the second direction in response to the first movement of the user interface member in the first direction.

With the bicycle operating device according to the second aspect, the input member certainly transmits the first movement of the user interface member to the electrical switch even though the second direction is different from the first direction.

In accordance with a third aspect of the present invention, the bicycle operating device according to the second aspect is configured so that the input member faces the electrical switch to transmit the first movement of the user interface member to the electrical switch in the second direction.

With the bicycle operating device according to the third aspect, the input member more certainly transmits the first movement of the user interface member to the electrical switch even though the second direction is different from the first direction.

In accordance with a fourth aspect of the present invention, the bicycle operating device according to the second or third aspects is configured so that the user interface member is movable relative to the base member between a first rest position and a first operated position. The input member is movable relative to the electrical switch between a second rest position and a second operated position at which the electrical switch is operated by the input member. The input member is movable relative to the electrical switch from the second rest position to the second operated position in response to the first movement of the user interface member from the first rest position to the first operated position.

With the bicycle operating device according to the fourth aspect, the input member more certainly transmits the first movement of the user interface member to the electrical switch even though the second direction is different from the first direction.

In accordance with a fifth aspect of the present invention, the bicycle operating device according to the fourth aspect is configured so that the user interface member is movable relative to the base member between the first rest position and the first operated position without contacting the input member.

With the bicycle operating device according to the fifth aspect, it is possible to smoothly move each of the user interface member and the input member without interference between the user interface member and the input member.

In accordance with a sixth aspect of the present invention, the bicycle operating device according to any one of the second to fifth aspects is configured so that the user interface member is pivotally coupled to the base member about a pivot axis. The input member is movable between a second rest position and a second operated position at which the electrical switch is operated by the input member. The second operated position is closer to the pivot axis than the second rest position.

With the bicycle operating device according to the sixth aspect, this arrangement of the pivot axis, the second rest position, and the second operated position smoothens the movement of the input member.

In accordance with a seventh aspect of the present invention, the bicycle operating device according to any one of the second to sixth aspects is configured so that the transmitting structure includes an intermediate member provided between the user interface member and the input member to transmit the first movement of the user interface member to the input member.

With the bicycle operating device according to the seventh aspect, the intermediate member certainly transmits the first movement of the user interface member to the input member even though the second direction is different from the first direction.

In accordance with an eighth aspect of the present invention, the bicycle operating device according to the seventh aspect is configured so that the user interface member is movable relative to the base member between a first rest position and a first operated position. The intermediate member includes a biasing part to bias the user interface member from the first operated position to the first rest position.

With the bicycle operating device according to the eighth aspect, the biasing part stabilizes the position of the user interface member.

In accordance with a ninth aspect of the present invention, the bicycle operating device according to the seventh or eighth aspect is configured so that the intermediate member includes a first contact surface and a second contact surface. The first contact surface is configured to contact the user interface member. The second contact surface is configured to contact the input member.

With the bicycle operating device according to the ninth aspect, the first contact surface and the second contact surface certainly transmit the first movement of the user interface member to the input member even though the second direction is different from the first direction.

In accordance with a tenth aspect of the present invention, the bicycle operating device according to the ninth aspect is configured so that the first contact surface faces in a direction different from the first direction. The second contact surface faces in the second direction.

With the bicycle operating device according to the tenth aspect, it is possible to improve freedom of the arrangement of the intermediate member.

In accordance with an eleventh aspect of the present invention, the bicycle operating device according to any one of the seventh to tenth aspects is configured so that the intermediate member includes a first coupling end and a second coupling end. The first coupling end is coupled to the user interface member. The second coupling end is coupled to the input member.

With the bicycle operating device according to the eleventh aspect, the first coupling end and the second coupling end certainly transmit the first movement of the user interface member to the input member even though the second direction is different from the first direction.

In accordance with a twelfth aspect of the present invention, the bicycle operating device according to the eleventh aspect is configured so that the first coupling end includes a first contact surface configured to contact the user interface member. The first contact surface faces in a direction different from the first direction.

With the bicycle operating device according to the twelfth aspect, the first coupling end more certainly transmits the first movement of the user interface member to the input member even though the second direction is different from the first direction.

In accordance with a thirteenth aspect of the present invention, the bicycle operating device according to the eleventh or twelfth aspect is configured so that the second coupling end includes a second contact surface. The second contact surface faces in the second direction.

With the bicycle operating device according to the thirteenth aspect, the second coupling end more certainly transmits the first movement of the user interface member to the input member even though the second direction is different from the first direction.

In accordance with a fourteenth aspect of the present invention, the bicycle operating device according to any one of the eleventh to thirteenth aspects is configured so that the first coupling end includes a first opening. The user interface member includes a projection extending through the first opening.

With the bicycle operating device according to the fourteenth aspect, it is possible to couple the first coupling end to the user interface member with a simple structure.

In accordance with a fifteenth aspect of the present invention, the bicycle operating device according to any one of the eleventh to fourteenth aspects is configured so that the second coupling end includes a second opening. The input member extends through the second opening.

With the bicycle operating device according to the fifteenth aspect, it is possible to couple the second coupling end to the input member with a simple structure.

In accordance with a sixteenth aspect of the present invention, the bicycle operating device according to any one of the eleventh to fifteenth aspects is configured so that the user interface member is pivotally coupled to the base member about a pivot axis. The second coupling end is closer to the pivot axis than the first coupling end.

With the bicycle operating device according to the sixteenth aspect, this arrangement of the pivot axis, the first coupling end, and the second coupling end smoothens the movement of the input member.

In accordance with a seventeenth aspect of the present invention, the bicycle operating device according to any one of the first to sixteenth aspects is configured so that the user interface member is pivotally coupled to the base member about a pivot axis. The first direction is defined as a tangential direction defined about the pivot axis. The second direction is defined as a straight direction.

With the bicycle operating device according to the seventeenth aspect, it is possible to convert the first movement of the user interface member in the tangential direction to a straight movement in the straight direction with the transmitting structure.

In accordance with an eighteenth aspect of the present invention, the bicycle operating device according to any one of the first to seventeenth aspects further comprises a wireless communicator electrically connected to the electrical switch to wirelessly transmit a signal to a bicycle component in response to an operation of the electrical switch.

With the bicycle operating device according to the eighteenth aspect, it is possible to wirelessly operate the bicycle component using the wireless communicator.

In accordance with a nineteenth aspect of the present invention, the bicycle operating device according to the eighteenth aspect is configured so that the wireless communicator is mounted to the base member.

With the bicycle operating device according to the nineteenth aspect, it is possible to stabilize the orientation of the wireless communicator relative to the base member.

In accordance with a twentieth aspect of the present invention, the bicycle operating device according to the nineteenth aspect further comprises a housing mounted to the base member, the housing including an interior space. At least one of the electrical switch and the wireless communicator is provided in the interior space.

With the bicycle operating device according to the twentieth aspect, the housing protects the at least one of the electrical switch and the wireless communicator.

In accordance with a twenty-first aspect of the present invention, the bicycle operating device according to any one of the first to twentieth aspects further comprises an electricity generator configured to generate electricity in response to the first movement of the user interface member.

With the bicycle operating device according to the twenty-first aspect, it is possible to utilize the first movement of the user interface member to generate electricity.

In accordance with a twenty-second aspect of the present invention, the bicycle operating device according to the twenty-first aspect is configured so that the transmitting structure includes an input member movable relative to the base member in the second direction in response to the first movement of the user interface member in the first direction. The electricity generator is configured to generate electricity in response to a second movement of the input member in the second direction.

With the bicycle operating device according to the twenty-second aspect, it is possible to utilize the second movement of the input member to generate electricity.

In accordance with a twenty-third aspect of the present invention, the bicycle operating device according to any one of the first to twenty-second aspects is configured so that the base member includes a mounting portion configured to be mounted within an interior of a free end of a bicycle handlebar in a mounting state where the base member is mounted to the free end of the bicycle handlebar.

With the bicycle operating device according to the twenty-third aspect, it is possible to mount the bicycle operating device to the bicycle handlebar with the mounting portion.

In accordance with a twenty-fourth aspect of the present invention, the bicycle operating device according to the twenty-third aspect is configured so that the base member has a longitudinal direction parallel to a center axis of the free end of the bicycle handlebar in the mounting state. The base member includes a first base end and a second base end opposite to the first base end along the longitudinal direction. The user interface member is located at the first base end. The mounting portion of the base member is located at the second base end.

With the bicycle operating device according to the twenty-fourth aspect, it is possible to make the bicycle operating device compact.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiment(s) will now be described with reference to the accompanying drawings, wherein like reference numerals designate corresponding or identical elements throughout the various drawings.

Figure 1:
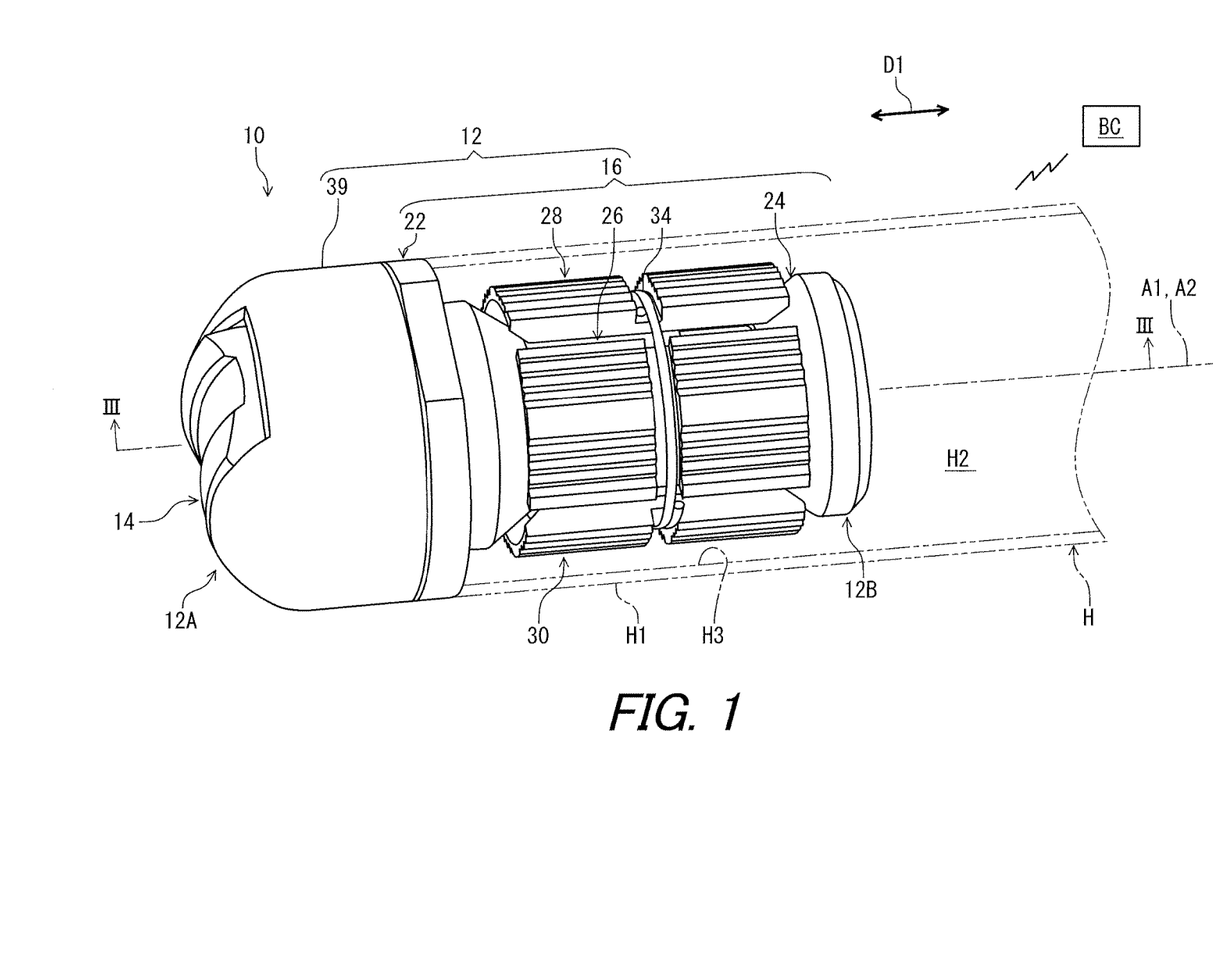
FIG. 1 is a perspective view of a bicycle operating device in accordance with an embodiment.

Referring initially to FIG. 1, a bicycle operating device 10 in accordance with an embodiment is configured to be mounted to a bicycle handlebar H. The bicycle operating device 10 is configured to operate a bicycle component BC. Examples of the bicycle component BC includes an electric shift device, an electric seatpost, an electric suspension, and other electric devices. In this embodiment, the bicycle operating device 10 is configured to be mounted to a free end H1 of the bicycle handlebar H such as a time trial handlebar, a bull horn handlebar, or a flat handlebar. Namely, the bicycle operating device 10 is constructed as a bar-end type operating device. However, the bicycle operating device 10 can be mounted to other type of handlebar if needed and/or desired. The bicycle operating device can be mounted to a part other than the bicycle handlebar H. The bicycle operating device 10 can be a right-hand side operating device and a left-hand side operating device.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing the bicycle handlebar H. Accordingly, these terms, as utilized to describe the bicycle operating device 10, should be interpreted relative to the bicycle equipped with the bicycle operating device 10 as used in an upright riding position on a horizontal surface.

The bicycle operating device 10 comprises a base member 12 and a user interface member 14. The base member 12 is configured to be mounted to the free end H1 of the bicycle handlebar H. The user interface member 14 is provided outside the bicycle handlebar H to receive a user input.

The base member 12 includes a mounting portion 16 configured to be mounted within an interior H2 of the free end H1 of the bicycle handlebar H in a mounting state where the base member 12 is mounted to the free end H1 of the bicycle handlebar H. The base member 12 has a longitudinal direction D1 parallel to a center axis A1 of the free end H1 of the bicycle handlebar H in the mounting state. The base member 12 includes a first base end 12A and a second base end 12B opposite to the first base end 12A along the longitudinal direction D1. The user interface member 14 is located at the first base end 12A. The mounting portion 16 of the base member 12 is located at the second base end 12B. In this embodiment, the base member 12 includes a plurality of parts. The base member 12 can be integrally provided as a one-piece unitary member.

Figure 2:
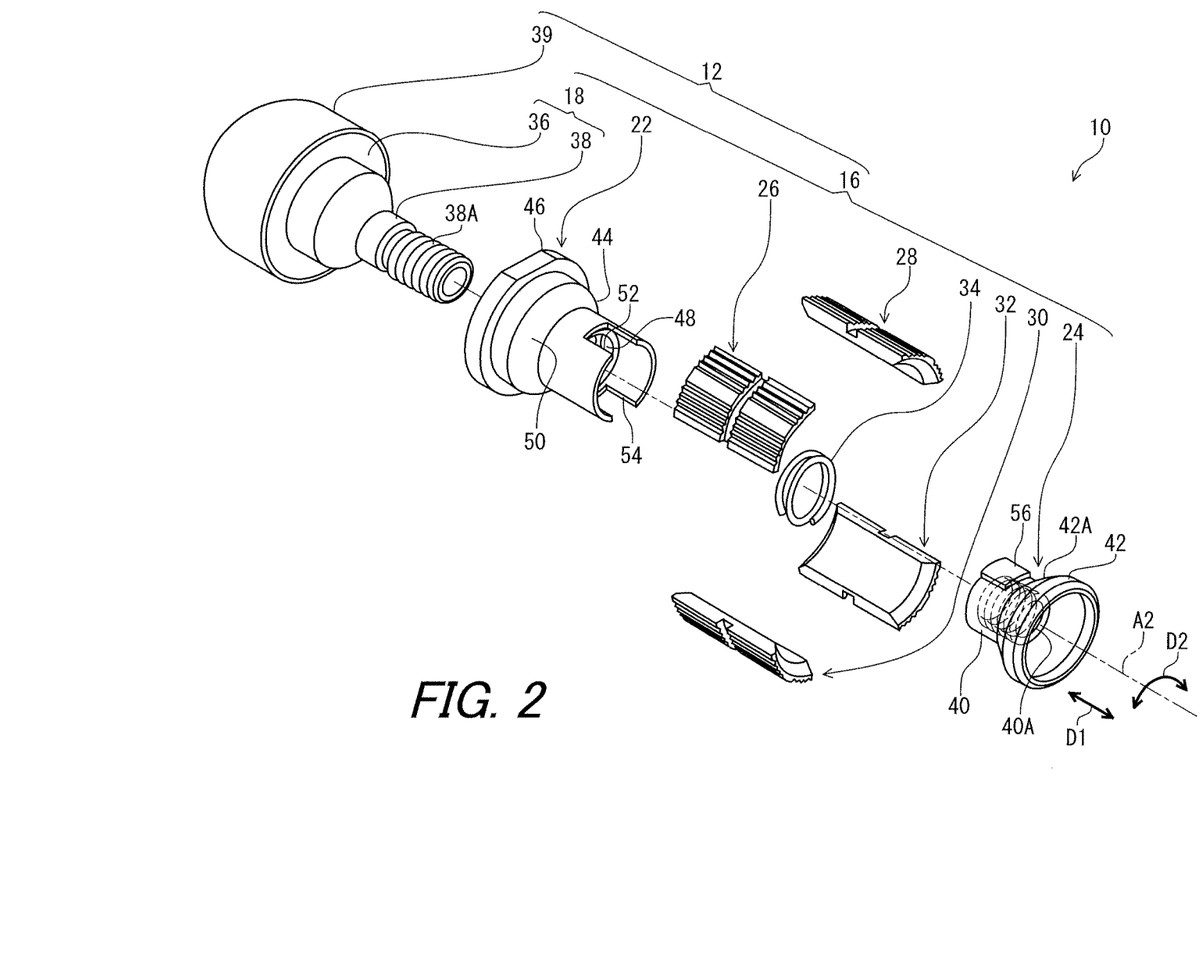
FIG. 2 is an exploded perspective view of the bicycle operating device illustrated in FIG. 1.

As seen in FIG. 2, the mounting portion 16 includes a base body 18, a rotatable member 22, an adjustment member 24, a first expansion member 26, a second expansion member 28, a third expansion member 30, a fourth expansion member 32, and an elastic ring 34. The rotatable member 22 is rotatably mounted on the base body 18 about a rotational axis A2 extending in the longitudinal direction D1. The adjustment member 24 is movably mounted to the base body 18. The adjustment member 24 is rotatable relative to the base body 18 about the rotational axis A2 and is movable relative to the base body 18 in the longitudinal direction D1.

In this embodiment, the base body 18 includes an attachment part 36 and a coupling support 38. The coupling support 38 extends from the attachment part 36 in the longitudinal direction D1. The base member 12 includes a cover 39. The cover 39 is detachably attached to the base body 18. Specifically, the cover 39 is attached to the attachment part 36. However, the cover 39 can be omitted from the base member 12.

The term "detachably attached" or "detachably attaching," as used herein, encompasses configurations in which an element directly secured to another element by directly affixing the element to the other element while the element is detachable from the other element without substantial damage; and configurations in which the element is indirectly secured to the other element via intermediate member(s) while the element is detachable from the other element and the intermediate member(s) without substantial damage. This concept also applies to words of similar meaning, for example, "detachably secured," "detachably joined," "detachably connected," "detachably coupled," "detachably mounted," "detachably bonded," "detachably fixed" and their derivatives.

Figure 3:
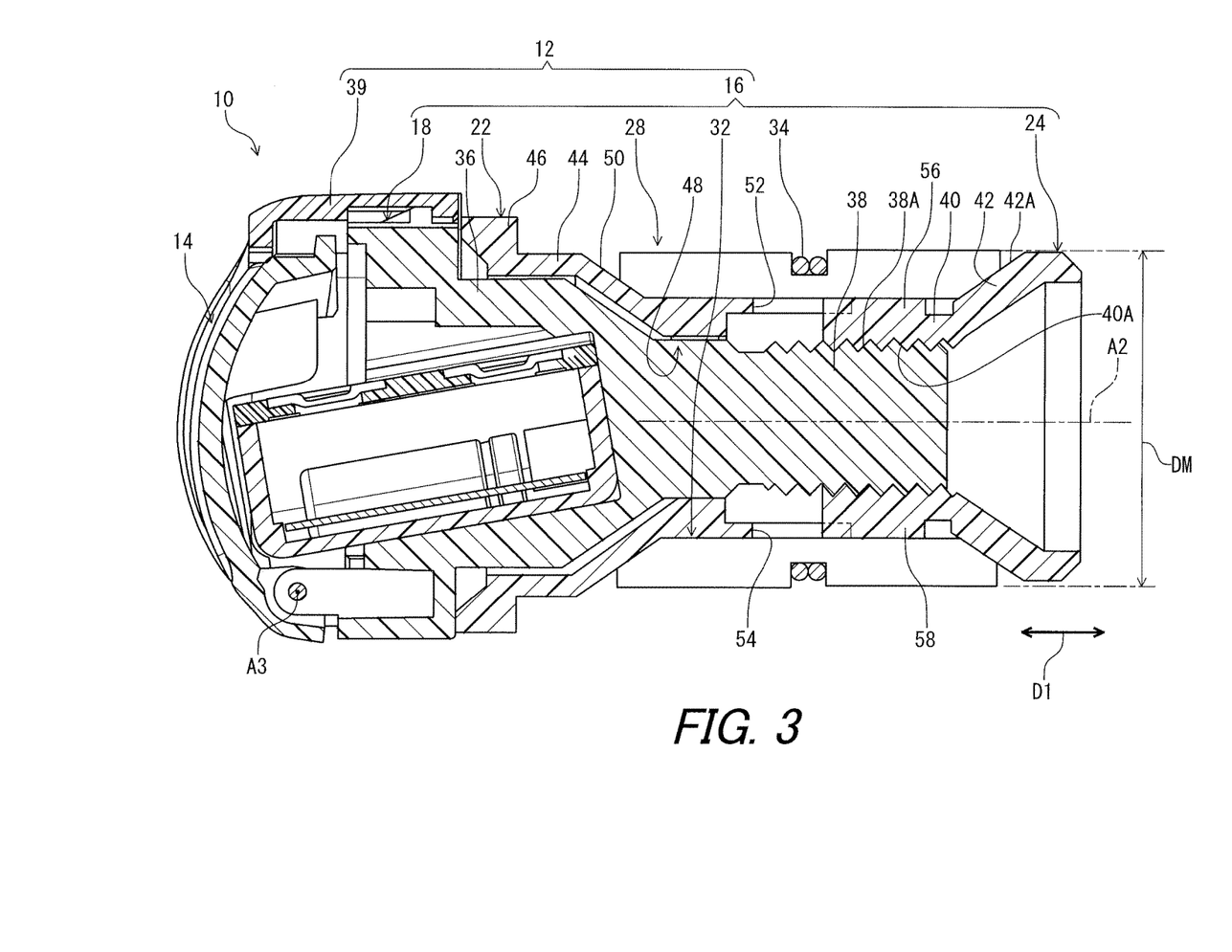
FIG. 3 is a cross-sectional view of the bicycle operating device taken along line of FIG. 1.
Figure 4:
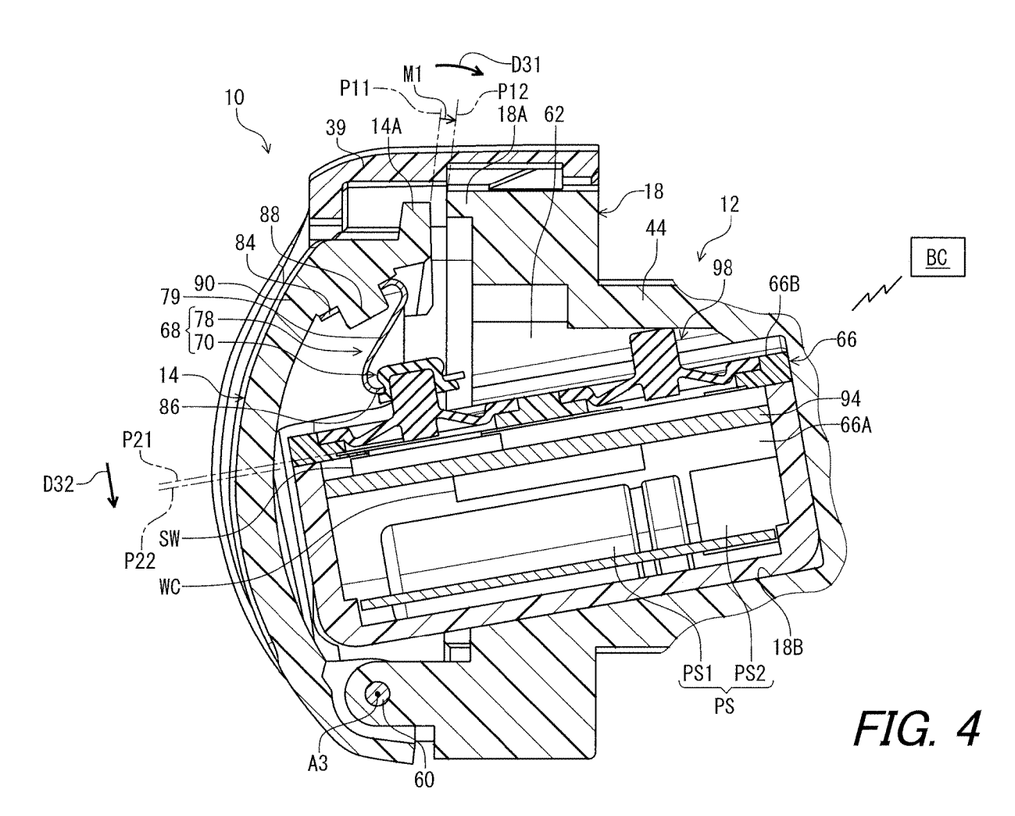
FIG. 4 is another cross-sectional view of the bicycle operating device illustrated in FIG. 1.

As seen in FIGS. 3 and 4, the coupling support 38 includes an externally threaded part 38A. The adjustment member 24 includes a coupling part 40 and a guide part 42. The coupling part 40 extends from the guide part 42 in the longitudinal direction D1 and includes a coupling threaded hole 40A. The externally threaded part 38A is threadedly engaged with the coupling threaded hole 40A. Rotation of the adjustment member 24 relative to the base body 18 moves the adjustment member 24 relative to the base body 18 in the longitudinal direction D1. The guide part 42 includes a guide surface 42A. The guide surface 42A is inclined relative to the rotational axis A2 and is in slidable contact with the first to fourth expansion members 26 to 32.

The rotatable member 22 includes a tubular body 44 and a flange 46. The flange 46 extends radially outwardly from an axial end of the tubular body 44. The tubular body 44 includes a through-hole 48, an additional guide surface 50, a first guide recess 52, and a second guide recess 54. The through-hole 48 extends along the rotational axis A2. The coupling support 38 extends through the through-hole 48 to rotatably support the rotatable member 22. The additional guide surface 50 is in slidable contact with the first to fourth expansion members 26 to 32.

The adjustment member 24 includes a first slide part 56 and a second slide part 58. The first slide part 56 extends radially outwardly from the coupling part 40 and is movably provided in the first guide recess 52. The second slide part 58 extends radially outwardly from the coupling part 40 and is movably provided in the second guide recess 54. The first slide part 56 is provided on an opposite side of the second slide part 58 with respect to the rotational axis A2.

The adjustment member 24 is coupled to the rotatable member 22 to rotate relative to the base body 18 along with the rotatable member 22. Furthermore, the adjustment member 24 is coupled to the rotatable member 22 to be movable relative to the rotatable member 22 in the longitudinal direction D1. Rotation of the rotatable member 22 relative to the base body 18 rotates the adjustment member 24 relative to the base body 18 about the rotational axis A2, moving the adjustment member 24 relative to the base body 18 and the rotatable member 22 in the longitudinal direction D1.

As seen in FIGS. 3 and 4, the first to fourth expansion members 26 to 32 are radially movable relative to the base body 18. The first to fourth expansion members 26 to 32 are arranged in a circumferential direction D2 (FIG. 2) defined about the rotational axis A2 to define an outer diameter DM. The first to fourth expansion members 26 to 32 are radially supported by the rotatable member 22 and the adjustment member 24.

The elastic ring 34 elastically couples the first to fourth expansion members 26 to 32 to bias the first to fourth expansion members 26 to 32 toward the rotational axis A2. This presses the first to fourth expansion members 26 to 32 against the guide surface 42A and the additional guide surface 50. Examples of the elastic ring 34 include a coil spring.

Rotation of the rotatable member 22 relative to the base body 18 moves the adjustment member 24 relative to the base body 18 in the longitudinal direction D1, moving the first to fourth expansion members 26 to 32 to increase or decrease the outer diameter DM (FIG. 3). The first to fourth expansion members 26 to 32 come into contact with an inner peripheral surface H3 (FIG. 1) of the bicycle handlebar H when the outer diameter DM increase in response to the rotation of the rotatable member 22. Thus, the bicycle operating device 10 is detachably mounted to the bicycle handlebar H.

As seen in FIG. 4, the user interface member 14 is movably mounted to the base member 12 to move relative to the base member 12 in a first direction D31. The user interface member 14 is movable relative to the base member 12 between a first rest position P11 and a first operated position P12. The user interface member 14 is pivotally coupled to the base member 12 about a pivot axis A3. The user interface member 14 is pivotable relative to the base member 12 from the first rest position P11 to the first operated position P12 in the first direction D31.

As seen in FIG. 4, the user interface member 14 includes a stopper 14A. The stopper 14A is spaced apart from a receiving part 18A of the base body 18 in a state where the user interface member 14 is at the first rest position P11. The user interface member 14 is in contact with the cover 39 in a state where the user interface member 14 is at the first rest position P11. The stopper 14A is in contact with the receiving part 18A of the base body 18 in a state where the user interface member 14 is at the first operated position P12. In this embodiment, the user interface member 14 is pivotally coupled to the base body 18 about the pivot axis A3. However, the user interface member 14 can be pivotally coupled to other parts.

In the present application, the term "rest position" as used herein refers to a position at which a movable part such as the user interface member 14 remains stationary in a state where the movable part is not operated by the user. The term "operated position" as used herein refers to a position at which the movable part has been operated by the user to perform the operation of the bicycle component.

Figure 5:
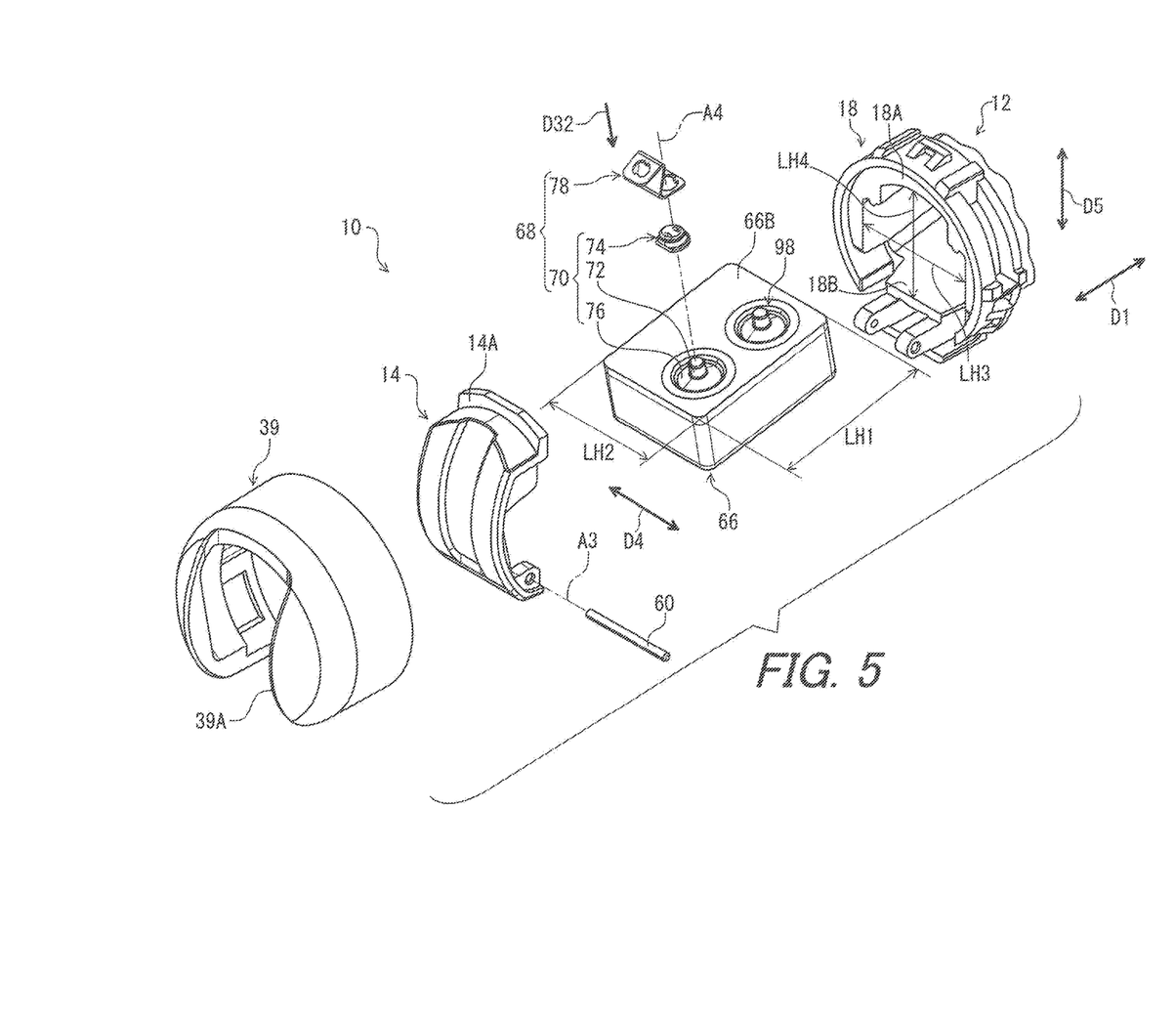
FIG. 5 is another exploded perspective view of the bicycle operating device illustrated in FIG. 1.

As seen in FIG. 5, the user interface member 14 is pivotally coupled to the base body 18 with a pivot shaft 60. The cover 39 includes an opening 39A. The user interface member 14 is movably provided in the opening 39A.

As seen in FIG. 4, the bicycle operating device 10 comprises an electrical switch SW mounted to the base member 12. The electrical switch SW is mounted to the base member 12 to receive a user input from the user interface member 14. The electrical switch SW is provided between the user interface member 14 and the base body 18. The base body 18, the cover 39, and the user interface member 14 define an accommodation space 62. The electrical switch SW is provided in the accommodation space 62. In this embodiment, the electrical switch SW is a normally open switch including an electrical contact. However, the electrical switch SW can be other type of switch.

The bicycle operating device 10 further comprises a housing 66 mounted to the base member 12. The housing 66 includes an interior space 66A. The electrical switch SW is provided in the interior space 66A. The housing 66 includes a first outer surface 66B. The first outer surface 66B faces in the second direction D32.

As seen in FIG. 5, the first outer surface 66B has a first length LH1 and a second length LH2. The first length LH1 is defined along the longitudinal direction D1 in a state where the housing 66 is mounted to the base member 12. The second length LH2 is defined in an axial direction D4 perpendicular to each of the longitudinal direction D1 and the second direction D32 in the state where the housing 66 is mounted to the base member 12. The axial direction D4 is parallel to the pivot axis A3. The first length LH1 is larger than the second length LH2. The accommodation space 62 has a third length LH3 and a fourth length LH4. The third length LH3 is a maximum length of the accommodation space 62 defined on a plane perpendicular to the longitudinal direction D1. The third length LH3 is defined in an axial direction D4 parallel to the pivot axis A3. The fourth length LH4 is defined in a direction D5 perpendicular to each of the longitudinal direction D1 and the axial direction D4. The third length LH3 is larger than the fourth length LH4.

One of the first length LH1 and the second length LH2 is larger than the third length LH3. In this embodiment, the first length LH1 is larger than the third length LH3. The second length LH2 is smaller than the third length LH3. The first length LH1 and the second length LH2 are larger than the fourth length LH4. However, the first length LH1 can be equal to or smaller than the third length LH3. The first length LH1 can be equal to or smaller than the second length LH2. At least one of the first length LH1 and the second length LH2 can be equal to or smaller than the fourth length LH4.

As seen in FIGS. 4 and 5, the housing 66 is attached to the base body 18 and is provided in the accommodation space 62. The base body 18 includes an accommodation recess 18B. The housing 66 is provided in the accommodation recess 18B.

As seen in FIG. 4, the bicycle operating device 10 comprises a transmitting structure 68. The transmitting structure 68 is provided between the user interface member 14 and the electrical switch SW to transmit a first movement M1 of the user interface member 14 in the first direction D31 to the electrical switch SW in a second direction D32 different from the first direction D31. In this embodiment, the first direction D31 is defined as a tangential direction defined about the pivot axis A3. The second direction D32 is defined as a straight direction. However, the first direction D31 and the second direction D32 are not limited to this embodiment. In this embodiment, the transmitting structure 68 is provided in the accommodation space 62. However, the arrangement of the transmitting structure 68 is not limited to this embodiment.

The transmitting structure 68 includes an input member 70. The input member 70 is movable relative to the base member 12 in the second direction D32 in response to the first movement M1 of the user interface member 14 in the first direction D31. The input member 70 faces the electrical switch SW to transmit the first movement M1 of the user interface member 14 to the electrical switch SW in the second direction D32. In this embodiment, the input member 70 is movably mounted to the housing 66 in response to the first movement M1 of the user interface member 14 in the first direction D31. Namely, the input member 70 is movably mounted to the base member 12 in response to the first movement M1 of the user interface member 14 in the first direction D31. In this embodiment, the input member 70 is spaced apart from the electrical switch SW and does not contact the electrical switch SW. However, the input member 70 can be configured to contact the electrical switch SW.

The input member 70 is movable relative to the electrical switch SW between a second rest position P21 and a second operated position P22 at which the electrical switch SW is operated by the input member 70. The input member 70 is movable relative to the electrical switch SW from the second rest position P21 to the second operated position P22 in response to the first movement M1 of the user interface member 14 from the first rest position P11 to the first operated position P12. The second operated position P22 is closer to the pivot axis A3 than the second rest position P21. The input member 70 positioned at the second operated position P22 is closer to the pivot axis A3 than the input member 70 positioned at the second rest position P21. However, the positional relationship between the pivot axis A3, the second rest position P21, and the second operated position P22 is not limited to this embodiment.

Figure 6:
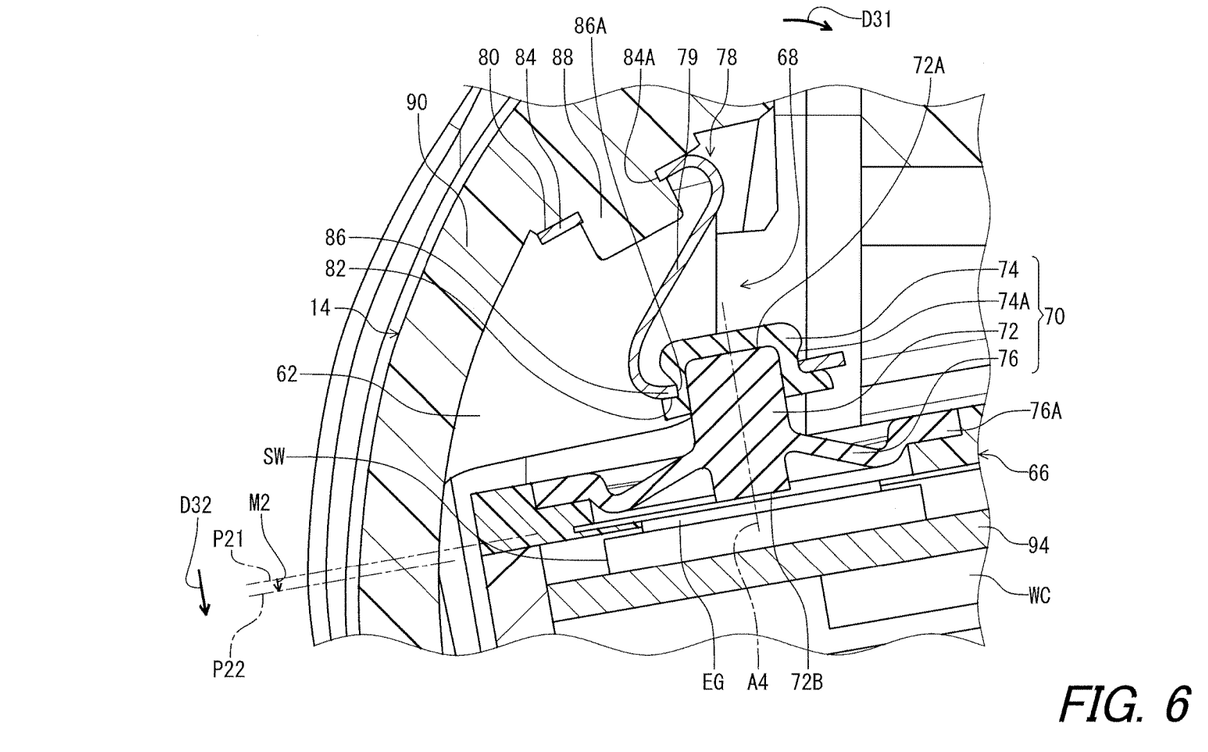
FIG. 6 is an enlarged cross-sectional view of the bicycle operating device illustrated in FIG. 4.

As seen in FIG. 6, the input member 70 includes an input body 72, a cap 74, and an elastic part 76. The input body 72 is movable relative to the electrical switch SW between the second rest position P21 and the second operated position P22. The input body 72 includes a first end 72A and a second end 72B and extends between the first end 72A and the second end 72B. The cap 74 is attached to the first end 72A. The second end 72B is spaced apart from the electrical switch SW in a state where the input body 72 is at the second rest position P21. The input body 72 has a center axis A4 and extends along the center axis A4. In this embodiment, the center axis is substantially parallel to the second direction D32. Namely, the input body 72 extends in the second direction D32.

The elastic part 76 extends radially outwardly from the input body 72. The elastic part 76 is provided between the first end 72A and second end 72B in the second direction D32. An outer periphery 76A of the elastic part 76 is secured to the housing 66. The elastic part 76 couples the input body 72 to the housing 66 to be movable relative to the housing 66 in the second direction D32.

In this embodiment, the input body 72 has a columnar shape, and the elastic part 76 has an annular shape. However, the shape of the input member 70 is not limited to this embodiment. The input body 72 is integrally provided with the elastic part 76 as a one-piece unitary member. However, the input body 72 can be a separate member from the elastic part 76. Furthermore, the cap 74 is a separate member from the input body 72. However, the cap 74 can be integrally provided with the input member 70. The cap 74 can be omitted from the input member 70.

As seen in FIG. 4, the user interface member 14 is movable relative to the base member 12 between the first rest position P11 and the first operated position P12 without contacting the input member 70. In other words, the user interface member 14 is movable relative to the base member 12 without directly contacting the input member 70. Specifically, the transmitting structure 68 includes an intermediate member 78. The intermediate member 78 is provided between the user interface member 14 and the input member 70 to transmit the first movement M1 of the user interface member 14 to the input member 70. The intermediate member 78 includes a biasing part 79 to bias the user interface member 14 from the first operated position P12 to the first rest position P11. In this embodiment, the intermediate member 78 is a leaf spring. However, the intermediate member 78 is not limited to this embodiment.

As seen in FIG. 6, the intermediate member 78 includes a first contact surface 80 and a second contact surface 82. The first contact surface 80 is configured to contact the user interface member 14. The second contact surface 82 is configured to contact the input member 70. The first contact surface 80 faces in a direction different from the first direction D31. The second contact surface 82 faces in the second direction D32. However, the first contact surface 80 can be disposed to face in other directions. The second contact surface 82 can be disposed to face in other directions.

The intermediate member 78 includes a first coupling end 84 and a second coupling end 86. The first coupling end 84 is coupled to the user interface member 14. The second coupling end 86 is coupled to the input member 70. The first coupling end 84 includes the first contact surface 80 configured to contact the user interface member 14. The second coupling end 86 includes the second contact surface 82. As seen in FIG. 4, the second coupling end 86 is closer to the pivot axis A3 than the first coupling end 84.

Figure 7:
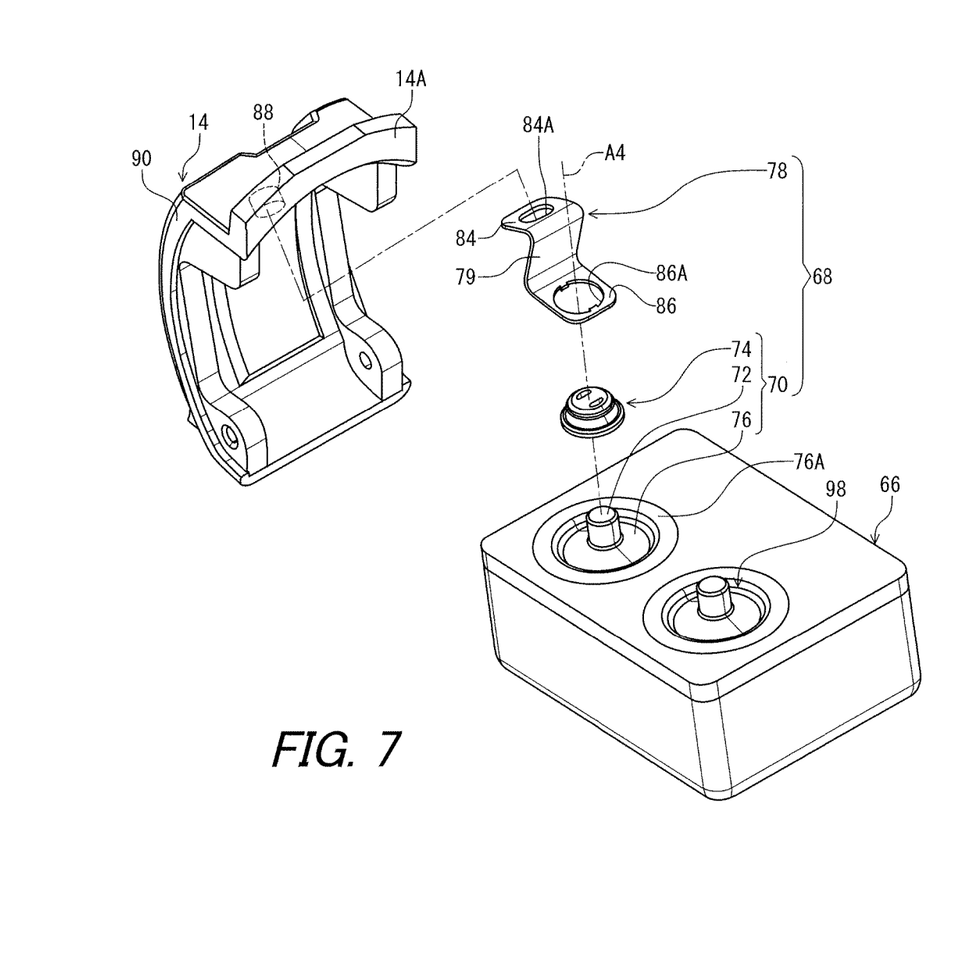
FIG. 7 is another exploded perspective view of a part of the bicycle operating device illustrated in FIG. 1.

As seen in FIGS. 6 and 7, the first coupling end 84 includes a first opening 84A. The user interface member 14 includes a projection 88 extending through the first opening 84A. The user interface member 14 includes an operation body 90 pivotally coupled to the base member 12. The projection 88 extends from the operation body 90. The first opening 84A can be omitted from the first coupling end 84, and the first coupling end 84 can be coupled to the user interface member 14.

The second coupling end 86 includes a second opening 86A. The input member 70 extends through the second opening 86A. In this embodiment, the input body 72 and the cap 74 extend through the second opening 86A. The cap 74 is provided in the second opening 86A. The cap 74 includes a coupling groove 74A having an annular shape. The second coupling end 86 is fitted in the coupling groove 74A. The second opening 86A can be omitted from the second coupling end 86, and the second coupling end 86 can be coupled to the input member 70.

The biasing part 79 extends between the first coupling end 84 and the second coupling end 86. The biasing part 79 couples the first coupling end 84 to the second coupling end 86. The biasing part 79 is integrally provided with the first coupling end 84 and the second coupling end 86 as a one-piece unitary member. However, the biasing part 79 can be a separate member from at least one of the first coupling end 84 and the second coupling end 86.

In this embodiment, the input body 72 and the cap 74 are made of a non-metallic material such as rubber. The intermediate member 78 is made of a metallic material such as a spring steel. However, the materials of these members are not limited to this embodiment.

As seen in FIG. 4, the transmitting structure 68 (e.g., the input member 70 and the intermediate member 78) positions the user interface member 14 at the first rest position P11 in a state where the user interface member 14 is not operated by the user. The input member 70 moves from the second rest position P21 to the second operated position P22 in the second direction D32 when the user interface member 14 is pivoted from the first rest position P11 to the first operated position P12 by the user.

The intermediate member 78 transmits the first movement M1 (e.g., a pivotal movement) of the user interface member 14 to the input member 70. The input body 72 is moved from the second rest position P21 to the second operated position P22 in the second direction D32 in response to the first movement M1 of the user interface member 14. The elastic part 76 keeps the center axis A4 of the input body 72 relative to the electrical switch SW parallel to the second direction D32 when the input body 72 is moved from the second rest position P21 to the second operated position P22 in the second direction D32. The intermediate member 78 (e.g., the biasing part 79) is elastically deformed to absorb a difference between the first movement M1 of the user interface member 14 and the second movement M2 of the input member 70 when the user interface member 14 is moved from the first rest position P11 to the first operated position P12. The user interface member 14 returns from the first operated position P12 to the first rest position P11 because of the biasing force generated by at least one of the input member 70 and the intermediate member 78.

Figure 8:
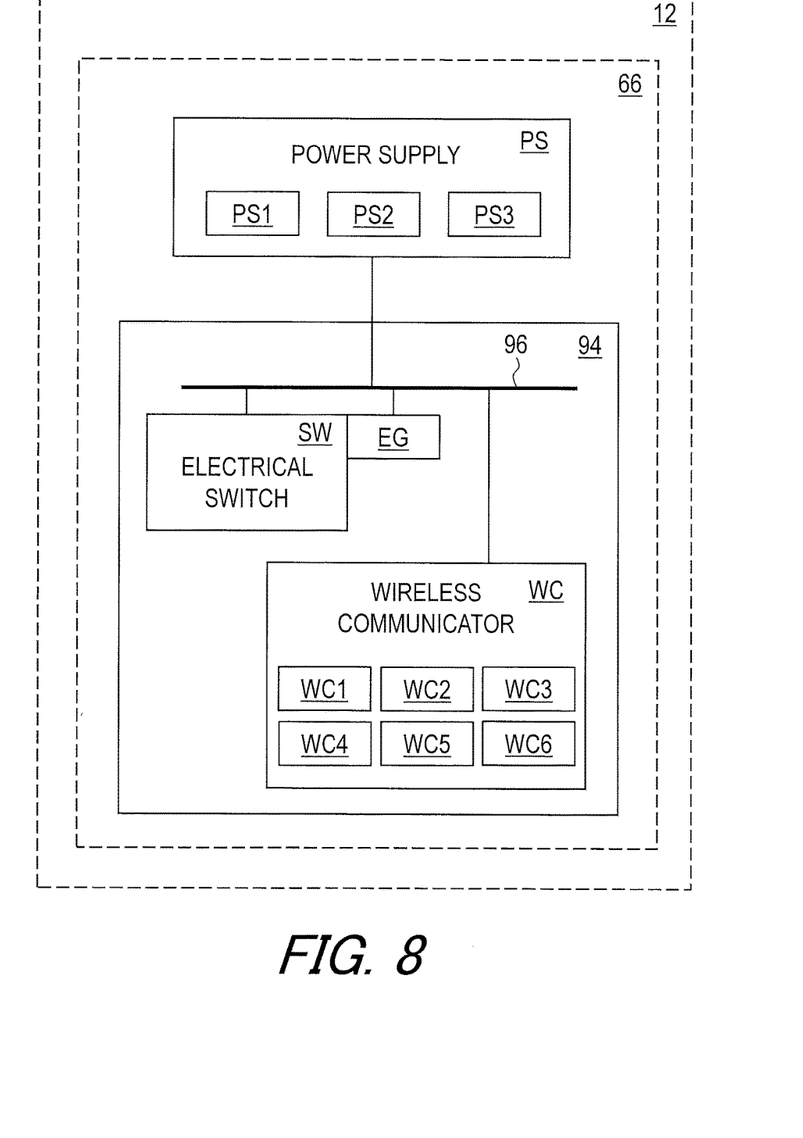
FIG. 8 is a schematic block diagram of the bicycle operating device illustrated in FIG. 1.

As seen in FIGS. 4 and 8, the bicycle operating device 10 further comprises a wireless communicator WC electrically connected to the electrical switch SW to wirelessly transmit a signal to the bicycle component BC (FIG. 1) in response to an operation of the electrical switch SW. The wireless communicator WC is mounted to the base member 12. At least one of the electrical switch SW and the wireless communicator WC is provided in the interior space 66A of the housing 66. The wireless communicator WC is mounted to the base member 12 outside the bicycle handlebar H in a mounting state where the base member 12 is mounted to the free end H1 of the bicycle handlebar H. The housing 66 is made of non-metallic material such as resin material to transmit the signal. The base body 18 is made of non-metallic material such as resin material to transmit the signal. The cover 39 is made of non-metallic material such as resin material to transmit the signal. The user interface member 14 is made of non-metallic material such as resin material to transmit the signal. In this embodiment, the electrical switch SW and the wireless communicator WC are provided in the interior space 66A. However, the positions of the electrical switch SW and the wireless communicator WC are not limited to this embodiment. In this embodiment, the bicycle operating device 10 is configured to wirelessly operate the bicycle component BC. However, the bicycle operating device 10 can be configured to operate the bicycle component BC using a control cable. In such an embodiment, the wireless communicator WC can be omitted from the bicycle operating device 10.

The bicycle operating device 10 comprises a circuit board 94. In this embodiment, the electrical switch SW and the wireless communicator WC are electrically mounted on the circuit board 94. The circuit board 94 is secured to the housing 66 and is provided in the interior space 66A.

As seen in FIG. 8, the wireless communicator WC is electrically connected to the electrical switch SW with a bus 96. The wireless communicator WC includes a processor WC1, a memory WC2, a signal generating circuit WC3, a signal transmitting circuit WC4, a signal receiving circuit WC5, and an antenna WC6. Thus, the wireless communicator WC can also be referred to as a wireless communication circuit or circuitry WC in the present application. The processor WC1 includes a central processing unit (CPU) and a memory controller. The memory WC2 is electrically connected to the processor WC1. The memory WC2 includes a read only memory (ROM) and a random-access memory (RAM). The ROM includes a non-transitory computer-readable storage medium. The RAM includes a transitory computer-readable storage medium. The memory WC2 includes storage areas each having an address in the ROM and the RAM. The processor WC1 controls the memory WC2 to store data in the storage areas of the memory WC2 and reads data from the storage areas of the memory WC2. The memory WC2 (e.g., the ROM) stores a program. The program is read into the processor WC1, and thereby performing functions of the wireless communicator WC (e.g., at least part of functions of the signal generating circuit WC3, the signal transmitting circuit WC4, and the signal receiving circuit WC5).

The signal generating circuit WC3 generates wireless signals based on the input operation received by the electrical switch SW. The signal generating circuit WC3 superimposes digital signals on carrier wave using a predetermined wireless communication protocol to generate the wireless signals. The signal transmitting circuit WC4 transmits the wireless signal via the antenna WC6 in response to the input operation received by the electrical switch SW. In this embodiment, the signal generating circuit WC3 can encrypt control information (e.g., shift control command, seatpost control command, suspension control command, or other control commands) to generate encrypted wireless signals. The signal generating circuit WC3 encrypts digital signals stored in the memory WC2 using a cryptographic key. The signal transmitting circuit WC4 transmits the encrypted wireless signals. Thus, the wireless communicator WC wirelessly transmits the wireless signal to upshift or downshift the additional component BC2 when the electrical switch SW is closed to be activated by the input operation.

Further, the signal receiving circuit WC5 receives a wireless signal from the additional component BC2 via the antenna WC6. In this embodiment, the signal receiving circuit WC5 decodes the wireless signal to recognize information wirelessly transmitted from the additional component BC2. The signal receiving circuit WC5 may decrypt the encrypted wireless signal using the cryptographic key. Namely, the wireless communicator WC is configured to transmit a wireless signal to control the bicycle component BC and to receive a wireless signal to recognize information from the bicycle component BC. In other words, the wireless communicator WC is provided as a wireless transmitter and a wireless receiver. In this embodiment, the wireless communicator WC is integrally provided as a single module or unit. However, the wireless communicator WC can include a wireless transmitter and a wireless receiver which are provided as separate modules or units arranged at different positions from each other. The signal receiving circuit WC5 can be omitted from the wireless communicator WC.

As seen in FIGS. 4 and 8, the bicycle operating device 10 further comprises an electricity generator EG. The electricity generator EG is configured to generate electricity in response to the first movement M1 (FIG. 4) of the user interface member 14. The electricity generator EG is configured to generate electricity in response to a second movement M2 (FIG. 6) of the input member 70 in the second direction D32. The electricity generator EG generates the electricity using pressure and/or vibration caused by at least one of the first movement M1 (FIG. 4) and the second movement M2 (FIG. 6).

Examples of the electricity generator EG includes a piezoelectric element. The electricity generator EG is attached to the electrical switch SW and is disposed between the electrical switch SW and the input member 70. However, the electricity generator EG can be disposed at other positions. The electricity generator EG is electrically connected to the circuit board 94 (the bus 96).

As seen in FIG. 8, the bicycle operating device 10 further comprises a power supply PS. The power supply PS is electrically connected to the circuit board 94 (the bus 96). The power supply PS is electrically connected to the wireless communicator WC to supply electricity to the wireless communicator WC via the bus 96.

The power supply PS is electrically connected to the electricity generator EG to accumulate electricity generated by the electricity generator EG. The power supply PS includes a capacitor PS1, a rectifying circuit PS2, and a voltage regulator PS3. The capacitor PS1, the rectifying circuit PS2, and the voltage regulator PS3 are electrically connected to the electricity generator EG to rectify the electric energy generated by the electricity generator EG. The rectifying circuit PS2 is electrically connected to the circuit board 94 (the bus 96). The capacitor PS1 is electrically connected to the electricity generator EG to accumulate electricity generated by the electricity generator EG. The voltage regulator PS3 regulates the power source voltage to a level at which various circuits of the wireless communicator WC can properly operate. The regulated power source voltage is applied from the power supply PS to the wireless communicator WC. The electricity generator EG, the capacitor PS1, and the rectifying circuit PS2 can be omitted from the power supply PS when the power supply PS includes a battery or another power supply source.

As seen in FIG. 4, the power supply PS is provided in the housing 66. The capacitor PS1 and the rectifying circuit PS2 are provided in the interior space 66A of the housing 66. However, the power supply PS can be provided at other positions.

In this embodiment, as seen in FIG. 5, the housing 66 constitutes a single module including the input body 72, the electrical switch SW, the wireless communicator WC, the electricity generator EG, the power supply PS, and the circuit board 94. However, these elements can be at least partly provided as separate modules from each other. As seen in FIGS. 4 and 5, the single module further includes an additional input member 98 mounted to the housing 66. The additional input member 98 has substantially the same as the input member 70 except for the cap 74. The additional input member 98 can be utilized as the input member 70. Thus, it will not be described in detail here for the sake of brevity.

The assembling procedure of the bicycle operating device 10 will be described below referring to FIG. 5. As seen in FIG. 5, for example, the housing 66 is attached to the base body 18 with a fastener such as a screw or an adhesive agent when the bicycle operating device 10 is assembled. After that, the second coupling end 86 of the intermediate member 78 is attached to the input member 70 (the cap 74). Specifically, the cap 74 is inserted into the second opening 86A of the second coupling end 86. Next, the first coupling end 84 of the intermediate member 78 is attached to the user interface member 14. Specifically, the projection 88 (FIG. 6) of the user interface member 14 is inserted into the first opening 84A of the first coupling end 84. After that, the pivot shaft 60 is inserted into holes of the user interface member 14 and the base body 18. The cover 39 is attached to the base body 18. However, the assembling procedure of the bicycle operating device 10 is not limited to the above procedure.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
a base member;
a user interface member movably mounted to the base member to move relative to the base member in a first direction;
an electrical switch mounted to the base member; and
a transmitting structure provided between the user interface member and the electrical switch to transmit a first movement of the user interface member in the first direction to the electrical switch in a second direction different from the first direction.

2. The bicycle operating device according to claim 1, wherein
the transmitting structure includes an input member movable relative to the base member in the second direction in response to the first movement of the user interface member in the first direction.

3. The bicycle operating device according to claim 2, wherein
the input member faces the electrical switch to transmit the first movement of the user interface member to the electrical switch in the second direction.

4. The bicycle operating device according to claim 2, wherein
the user interface member is movable relative to the base member between a first rest position and a first operated position,
the input member is movable relative to the electrical switch between a second rest position and a second operated position at which the electrical switch is operated by the input member, and
the input member is movable relative to the electrical switch from the second rest position to the second operated position in response to the first movement of the user interface member from the first rest position to the first operated position.

5. The bicycle operating device according to claim 4, wherein
the user interface member is movable relative to the base member between the first rest position and the first operated position without contacting the input member.

6. The bicycle operating device according to claim 2, wherein
the user interface member is pivotally coupled to the base member about a pivot axis,
the input member is movable between a second rest position and a second operated position at which the electrical switch is operated by the input member, and
the second operated position is closer to the pivot axis than the second rest position.

7. The bicycle operating device according to claim 2, wherein
the transmitting structure includes an intermediate member provided between the user interface member and the input member to transmit the first movement of the user interface member to the input member.

8. The bicycle operating device according to claim 7, wherein
the user interface member is movable relative to the base member between a first rest position and a first operated position, and
the intermediate member includes a biasing part to bias the user interface member from the first operated position to the first rest position.

9. The bicycle operating device according to claim 7, wherein
the intermediate member includes
a first contact surface configured to contact the user interface member, and
a second contact surface configured to contact the input member.

10. The bicycle operating device according to claim 9, wherein
the first contact surface faces in a direction different from the first direction, and
the second contact surface faces in the second direction.

11. The bicycle operating device according to claim 7, wherein
the intermediate member includes
a first coupling end coupled to the user interface member, and
a second coupling end coupled to the input member.

12. The bicycle operating device according to claim 11, wherein
the first coupling end includes a first contact surface configured to contact the user interface member, and
the first contact surface faces in a direction different from the first direction.

13. The bicycle operating device according to claim 11, wherein
the second coupling end includes a second contact surface, and
the second contact surface faces in the second direction.

14. The bicycle operating device according to claim 11, wherein
the first coupling end includes a first opening, and
the user interface member includes a projection extending through the first opening.

15. The bicycle operating device according to claim 11, wherein
the second coupling end includes a second opening, and
the input member extends through the second opening.

16. The bicycle operating device according to claim 11, wherein
the user interface member is pivotally coupled to the base member about a pivot axis, and
the second coupling end is closer to the pivot axis than the first coupling end.

17. The bicycle operating device according to claim 1, wherein
the user interface member is pivotally coupled to the base member about a pivot axis,
the first direction is defined as a tangential direction defined about the pivot axis, and
the second direction is defined as a straight direction.

18. The bicycle operating device according to claim 1, further comprising
a wireless communicator electrically connected to the electrical switch to wirelessly transmit a signal to a bicycle component in response to an operation of the electrical switch.

19. The bicycle operating device according to claim 18, wherein
the wireless communicator is mounted to the base member.

20. The bicycle operating device according to claim 19, further comprising
a housing mounted to the base member, the housing including an interior space, wherein
at least one of the electrical switch and the wireless communicator is provided in the interior space.

21. The bicycle operating device according to claim 1, further comprising
an electricity generator configured to generate electricity in response to the first movement of the user interface member.

22. The bicycle operating device according to claim 21, wherein
the transmitting structure includes an input member movable relative to the base member in the second direction in response to the first movement of the user interface member in the first direction, and
the electricity generator is configured to generate electricity in response to a second movement of the input member in the second direction.

23. The bicycle operating device according to claim 1, wherein
the base member includes a mounting portion configured to be mounted within an interior of a free end of a bicycle handlebar in a mounting state where the base member is mounted to the free end of the bicycle handlebar.

24. The bicycle operating device according to claim 23, wherein
the base member has a longitudinal direction parallel to a center axis of the free end of the bicycle handlebar in the mounting state,
the base member includes a first base end and a second base end opposite to the first base end along the longitudinal direction,
the user interface member is located at the first base end, and
the mounting portion of the base member is located at the second base end.

25. The bicycle operating device according to claim 1, wherein
the transmitting structure is provided between the user interface member and the electrical switch to physically transmit the first movement of the user interface member in the first direction to the electrical switch in the second direction.

26. The bicycle operating device according to claim 1, wherein
the transmitting structure is provided between the user interface member and the electrical switch to transmit the first movement of the user interface member in the first direction to a second movement of the electrical switch in the second direction.

* * * * *